United States Patent
Zhu et al.

(10) Patent No.: US 11,738,329 B2
(45) Date of Patent: Aug. 29, 2023

(54) BIONIC FIBER ADSORPTIVE MATERIAL WITH MULTI-ADSORPTION SITES AND PREPARATION METHOD AND USE THEREOF

(71) Applicant: GUANGXI UNIVERSITY, Guangxi (CN)

(72) Inventors: Hongxiang Zhu, Guangxi (CN); Hui He, Guangxi (CN); Lei Wang, Guangxi (CN); Shuangfei Wang, Guangxi (CN); Hang Zhou, Guangxi (CN)

(73) Assignee: GUANGXI UNIVERSITY, Guangxi (CN)

( * ) Notice: Subject to any disclaimer, the term of this patent is extended or adjusted under 35 U.S.C. 154(b) by 199 days.

(21) Appl. No.: 17/214,942

(22) Filed: Mar. 29, 2021

(65) Prior Publication Data

US 2022/0241752 A1 Aug. 4, 2022

(30) Foreign Application Priority Data

Feb. 3, 2021 (CN) .......................... 202110152454.0

(51) Int. Cl.

| B01J 20/26 | (2006.01) |
|---|---|
| B01J 20/28 | (2006.01) |
| B01J 20/30 | (2006.01) |
| C02F 1/28 | (2023.01) |
| C08G 83/00 | (2006.01) |
| C08J 3/24 | (2006.01) |
| C02F 101/20 | (2006.01) |

(52) U.S. Cl.
CPC ....... *B01J 20/267* (2013.01); *B01J 20/28023* (2013.01); *B01J 20/3007* (2013.01); *B01J 20/3078* (2013.01); *C02F 1/285* (2013.01); *C02F 1/288* (2013.01); *C08G 83/006* (2013.01); *C08J 3/24* (2013.01); *B01J 20/262* (2013.01); *B01J 2220/445* (2013.01); *C02F 2101/20* (2013.01); *C08J 2351/02* (2013.01)

(58) Field of Classification Search
None
See application file for complete search history.

(56) References Cited

PUBLICATIONS

Zhou et al. Chemical Engineering Journal, 2021, 412, 128670. (Year: 2021).*
D'Halluin et al. ACS Sustainable Chem. Eng., 2017, 5, 1965-1973. (Year: 2017).*
Zhou et al. Chemical Engineering Journal, 2020, 285, 123879. (Year: 2020).*
Lee et al. Adv. Mater. Interfaces, 2018, 5, 1800585. (Year: 2018).*
Andrew Marais et al., "Coaxial Spinning of Oriented Nanocellulose Filaments and Core-Shell Structures for Interactive Materials and Fiber-Reinforced Composites", Applied Nano Materials, Sep. 17, 2020, pp. 10246-10251.
Guillermo Reyes et al., "Coaxial Spinning of All-Cellulose Systems for Enhanced Toughness: Filaments of Oxidized Nanofibrils Sheathed in Cellulose II Regenerated from a Protic Ionic Liquid", Biomacromolecules, Jan. 2, 2020, pp. 878-891.
Hang Zhou et al., "Design of amphoteric bionic fibers by imitating spider silk for rapid and complete removal of low-level multiple heavy metal ions", Chemical Engineering Journal, vol. 412, May 15, 2021, pp. 1-10.
Kyueui Lee et al., "Wet-to-Dry Hybrid Spinning of Graphene Fiber Inspired by Spider Silk Production Mechanisms", Advanced Materials Interfaces, Aug. 22, 2018, pp. 1-7.
Li Song et al., "Facile one-step fabrication of carboxymethyl cellulose based hydrogel for highly efficient removal of Cr(VI) under mild acidic condition", Chemical Engineering Journal, vol. 369, Aug. 1, 2019, pp. 641-651.
Hang Zhou et al., "Cellulose-based amphoteric adsorbent for the complete removal of low-level heavy metal ions via a specialization and cooperation mechanism", Chemical Engineering Journal, vol. 385, Apr. 1, 2020, pp. 1-11.

* cited by examiner

*Primary Examiner* — Clare M Perrin
(74) *Attorney, Agent, or Firm* — JCIP GLOBAL INC.

(57) ABSTRACT

The present invention provides a bionic fiber adsorptive material with multi-adsorption sites and a preparation method and use thereof, and the material is rich in multi-adsorption sites (N, O and S). The material is obtained by blending three polyethyleneimine polymers modified by multifunctional groups respectively with a carboxylated nanocellulose and graphene oxide, then adopting a coaxial spinning method based on a principle of imitating spider spinning, and then adopting a post-crosslinking technology. The material has a multilayer structure with the nanocellulose as a skeleton, the graphene oxide as an outer layer, and the three polyethyleneimine polymers modified by the multifunctional groups respectively as an inner layer, and a connection among the layers is a chemical bond connection. Densities of N, O and S adsorption sites of the material according to the present invention are all higher than 5 mmol/g.

6 Claims, No Drawings

BIONIC FIBER ADSORPTIVE MATERIAL WITH MULTI-ADSORPTION SITES AND PREPARATION METHOD AND USE THEREOF

CROSS-REFERENCE TO RELATED APPLICATION

This application claims the priority benefit of China application serial no. 202110152454.0, filed on Feb. 3, 2021. The entirety of the above-mentioned patent application is hereby incorporated by reference herein and made a part of this specification.

BACKGROUND

Technical Field

The present invention belongs to intelligent fiber functional materials, and specifically relates to a bionic fiber adsorptive material with multi-adsorption sites and a preparation method and use thereof.

Description of Related Art

Pollution of heavy metal ions in water bodies has caused serious harm to human health and ecosystems. Moreover, these heavy metal ions are often present in the water simultaneously, and therefore, proper treatment of wastewater before discharge is crucial. The main technologies used to reduce the metal content in industrial wastewater include membrane filtration, chemical precipitation, adsorption, ion exchange, electrolysis, reverse osmosis and solvent extraction. In these technologies, the adsorption method is regarded as one of the most effective methods to remove heavy metal ions in aqueous solutions, and the performance of the adsorbent plays a key role. Cellulose-based adsorbent has received extensive attention due to its advantages such as environmental protection, low cost, easy modification, and high efficiency. Many studies have reported that functional groups such as amino (—$NH_2$), carboxyl (—COOH), hydroxyl (—OH) and sulfur-containing groups can provide necessary adsorption sites for heavy metal ions. There are many kinds of anion and cation heavy metal ions in most water bodies simultaneously. At present, a preparation process of a cellulose-based adsorptive material with multi-adsorption sites is generally more complicated and the reaction efficiency is low. Density of functional groups of the cellulose-based adsorptive material with multi-adsorption sites is generally not high, and the density of each functional group is unbalanced, so it is difficult to achieve a rapid simultaneous removal of multiple anion and cation heavy metal ions at low concentrations.

SUMMARY

The technical problem to be solved by the present invention is to overcome the shortcomings of the above-mentioned technology and to provide a bionic fiber adsorptive material with multi-adsorption sites and a preparation method thereof. The material can rapidly and completely remove a variety of low-concentration anionic and cationic heavy metal ions simultaneously, and has a good selectivity and a high removal rate.

An objective of the present invention is to provide a bionic fiber adsorptive material with multi-adsorption sites.

Another objective of the present invention is to provide a preparation method of the above-mentioned bionic fiber adsorptive material with multi-adsorption sites.

Yet another objective of the present invention is to provide use of the above-mentioned bionic fiber adsorptive material with multi-adsorption sites.

The above-mentioned objectives of the present invention are achieved by the following technical solutions.

A bionic fiber adsorptive material with multi-adsorption sites is rich in multi-adsorption sites, that is, N, O and S sites that have adsorption performance for heavy metal ions; the material is obtained by blending three polyethyleneimine polymers modified by multifunctional groups respectively with a carboxylated nanocellulose and graphene oxide, then adopting a coaxial spinning method based on a principle of imitating spider spinning, and then adopting a post-cross-linking technology; the material has a multilayer structure with the nanocellulose as a skeleton, the graphene oxide as an outer layer, and the three polyethyleneimine polymers modified by the multifunctional groups respectively as an inner layer, and a connection among the layers is a chemical bond connection; the three polyethyleneimine polymers modified by the multifunctional groups respectively are a polyethyleneimine polymer modified by (ethylenedithio)diacetic acid containing N and S sites, a polyethyleneimine polymer modified by hyperbranched polycarboxylic acid containing N and O sites and a polyethyleneimine polymer modified by dopamine containing O and N sites, respectively; wherein the polyethyleneimine polymer modified by dopamine containing the O and N sites is obtained by modifying a polyethyleneimine with a polycarboxylic acid and dopamine; and the carboxylated nanocellulose is obtained by oxidizing a biomass fiber by a TEMPO/NaBr/NaClO oxidation system.

A preparation of the above-described bionic fiber adsorptive material with multi-adsorption sites includes the following steps.

Step S1, preparation of a carboxylated nanocellulose: adopting a TEMPO/NaBr/NaClO oxidation system to oxidize a biomass fiber, and regulating an oxidation level by controlling reaction conditions to obtain the carboxylated nanocellulose.

Step S2, preparation of a polyethyleneimine polymer modified by (ethylenedithio)diacetic acid containing N and S sites: performing amidation reaction of (ethylenedithio)diacetic acid with polyethyleneimine at high temperature to obtain the polyethyleneimine polymer modified by (ethylenedithio)diacetic acid containing the N and S sites.

Step S3, preparation of a polyethyleneimine polymer modified by dopamine containing O and N sites: performing amidation reaction of a polycarboxylic acid with dopamine at high temperature, when the reaction is complete, continuing to add polyethyleneimine to continue the amidation reaction to obtain the polyethyleneimine polymer modified by dopamine containing the O and N sites; the polycarboxylic acid is oxalic acid, citric acid or 1,2,3,4-butanetetracarboxylic acid.

Step S4, preparation of a polyethyleneimine polymer modified by hyperbranched polycarboxylic acid containing N and O sites: performing amidation reaction of hyperbranched polycarboxylic acid with polyethyleneimine at high temperature to obtain the polyethyleneimine polymer modified by hyperbranched polycarboxylic acid containing the N and O sites.

Step S5, blending the carboxylated nanocellulose obtained in the step S1, the polyethyleneimine polymer modified by (ethylenedithio)diacetic acid containing the N and S sites obtained in the step S2, the polyethyleneimine polymer modified by dopamine containing the O and N sites obtained in the step S3, the polyethyleneimine polymer modified by hyperbranched polycarboxylic acid containing the N and O sites obtained by the step S4 and graphene oxide by a blending method, preparing a spinning solution, adopting a coaxial spinning method based on a principle of imitating spider spinning, then adopting a post-crosslinking technology to obtain the bionic fiber adsorptive material with multi-adsorption sites; the material is rich in multi-adsorption sites, that is, N, O and S sites that have chelating performance for heavy metal ions; balancing and regulating content of each adsorption site in the material by regulating a ratio of each component in the spinning solution.

Further, a specific operation of the preparation of the carboxylated nanocellulose described in the step S1 is as follows: dispersing the biomass fiber in water, then adding NaBr with a mole fraction of 1-5 mmol/g absolute dry fiber and TEMPO with a mole fraction of 0.1-0.5 mmol/g absolute dry fiber into the biomass fiber mixture in turn, and then adding an NaOH solution with a mass fraction of 10-30% to adjust pH value of 10, adding an NaClO solution with a mole fraction of available chlorine of 6-30 mmol/g absolute dry fiber under a mixed liquid surface, mixing well, reacting for 4-8 hours, keeping adding the NaOH solution during the reaction to maintain pH value of 10 until the pH no longer changes, and adding ethanol to terminate the reaction to obtain the carboxylated nanocellulose.

Further, a specific operation of the preparation of the polyethyleneimine polymer modified by (ethylenedithio)diacetic acid containing N and S sites described in the step S2 is as follows: dispersing (ethylenedithio)diacetic acid in water, adding the polyethyleneimine with a molecular weight of 7000-70000 according to a molar ratio of (ethylenedithio)diacetic acid to the polyethyleneimine of 10:1-20:1, reacting for 4-8 hours at high temperature, using a dialysis bag with a molecular weight cut-off of 500-2000 to dialysis for 24-48 hours to remove unreacted small molecules, removing excess water by heating to adjust a concentration of a reaction product to 50 wt % to 90 wt % to obtain the polyethyleneimine polymer modified by (ethylenedithio) diacetic acid containing N and S sites.

Further, a specific operation of the preparation of the polyethyleneimine polymer modified by dopamine containing O and N sites described in the step S3 is as follows: adding the polycarboxylic acid and dopamine into water according to a molar ratio of 1:1-3:1, reacting for 4-8 hours at high temperature to prepare polycarboxylic acid-modified dopamine, then adding the polyethyleneimine with a molecular weight of 7000-70000 into a reaction system according to a molar ratio of polyethyleneimine to polycarboxylic acid of 1:10-1:20, continuing reacting for 4-8 hours, using a dialysis bag with a molecular weight cut-off of 500-2000 to dialysis for 24-48 hours to remove unreacted small molecules, removing excess water by heating to adjust a concentration of a reaction product to 50 wt % to 90 wt % to obtain the polyethyleneimine polymer modified by dopamine containing O and N sites.

Further, a specific operation of the polyethyleneimine polymer modified by hyperbranched polycarboxylic acid containing N and O sites described in the step S4 is as follows: mixing trimethylolpropane, citric acid and p-toluenesulfonic acid and reacting at 135-150° C. under stirring conditions for 1.5-2.5 hours to obtain hyperbranched polycarboxylic acid; a molar ratio of the trimethylolpropane to the citric acid is 0.1:0.3-0.1:0.4 and an added mass of the p-toluenesulfonic acid is 0.8/6-1.5% of a total mass of the trimethylolpropane and the citric acid; reacting the polyethyleneimine with the molecular weight of 7000-70000 and the hyperbranched polycarboxylic acid according to a mass ratio of 1:1-1:3 for 4-8 hours at high temperature, and heating to evaporate water to adjust a concentration of a reaction product to 50 wt % to 90 wt % to obtain the polyethyleneimine polymer modified by hyperbranched polycarboxylic acid containing N and O sites.

Further, a specific operation of the step S5 is as follows: blending the carboxylated nanocellulose obtained in the step S1, the polyethyleneimine polymer modified by (ethylenedithio)diacetic acid containing N and S sites obtained in the step S2, the polyethyleneimine polymer modified by dopamine containing O and N sites obtained in the step S3, the polyethyleneimine polymer modified by hyperbranched polycarboxylic acid containing N and O sites obtained in the step S4 and graphene oxide according to a mass ratio of 1:(1-10):(1-10):(1-10):(1-10), continuously spinning a fiber with multiple functional groups at a speed of 1-4 cm/s by a coaxial spinning method based on a principle of imitating spider spinning, spraying 5 wt % to 15 wt % of epichlorohydrin in a total fiber mass on the fiber by a spraying mode under vacuum filtration conditions with a vacuum degree of 0.01 MPa to 0.04 MPa to crosslink for 10-30 minutes, infiltrating the crosslinking agent epichlorohydrin into the fiber relying on a low vacuum, and freeze-drying for 24-48 hours to obtain the bionic fiber adsorptive material with multi-adsorption sites.

The bionic fiber adsorptive material with multi-adsorption sites according to the present invention is applicable to adsorption of low-concentration heavy metal ions; densities of N, O and S adsorption sites of the material are all higher than 5 mmol/g, which can achieve simultaneous, rapid and complete removal of multiple heavy metal ions.

Compared with the prior art, the present invention has the following beneficial effects.

(1) The present invention adopts the coaxial spinning method based on the principle of imitating spider spinning to prepare the bionic fiber adsorptive material rich in multi-adsorption sites which has a multilayer structure. This method can balance the density of each adsorption site, and densities of N, O and S adsorption sites of the material are all higher than 5 mmol/g. Since the balance and the high densities of the adsorption sites are the guarantee for the simultaneous, rapid and complete removal of the multiple heavy metal ions, the material prepared in the present invention can simultaneously, rapidly and completely remove the multiple heavy metal ions at low concentrations. Compared with the traditional fiber post-processing technology, this method solves the problems that in the fiber post-processing technology, adopting synchronous or stepwise grafting method to prepare fiber functional materials cannot balance the density of each adsorption site, and modification of high-density functional groups simultaneously causes the fiber to become brittle and increase diffusion and mass transfer of heavy metal ions in the material.

(2) The present invention adopts the coaxial spinning method based on the principle of imitating spider spinning to prepare the bionic fiber adsorptive material, and during the preparation, functional reagents used are efficiently converted into the adsorptive material, and a conversion rate of the reagents is higher than 99%, which is a green adsorptive material preparation strategy. It solves the problem of low reagent conversion rate in traditional fiber post-processing technology.

(3) The present invention adopts the coaxial spinning method to prepare the bionic fiber, and adopts the post-crosslinking technology to prepare the bionic fiber adsorptive material, ingenious use of vacuum filtration conditions (vacuum degree is 0.01 MPa to 0.04 MPa) is made, the crosslinking agent epichlorohydrin is sprayed on the bionic fiber by spraying, the crosslinking agent is infiltrated into the fiber relying on a low vacuum to flexibly control a fluffy structure of the fiber, and the freeze-drying method is adopted to obtain the bionic fiber adsorptive material with multi-adsorption sites with fluffy structure, multi-layer, multi-adsorption sites, which greatly improves the diffusion and mass transfer efficiency of heavy metal ions in the material, and the heavy metal ions can fully contact each adsorption site. Therefore, the bionic fiber adsorptive material prepared by the present invention can realize the simultaneous and complete removal of multiple heavy metal ions (anionic $Cr^{6+}$ and cationic $Cu^{2+}$, $Fe^{3+}$, $Cd^{2+}$ and $Pb^{2+}$ in water) at low concentrations within 30 minutes.

(4) The material of the present invention is rich in multi-adsorption sites (N, O and S), including phenolic hydroxyl, amino, carboxyl and sulfur-containing groups, and the material has a branched structure (hyperbranched polycarboxylic acid and branched polyethyleneimine), which is conducive to the intramolecular diffusion and mass transfer of heavy metal ions in the material, and the synergistic effect of the multifunctional groups, realizing the high-efficiency adsorption of $Cu^{2+}$, $Fe^{3+}$, $Cd^{2+}$, $Cr^{6+}$ and $Pb^{2+}$. Therefore, the material of present invention can rapidly remove of $Cu^{2+}$, $Fe^{3+}$, $Cd^{2+}$, $Cr^{6+}$ and $Pb^{2+}$ at low concentrations within 10 minutes to concentrations required by the national drinking water standard (US EPA).

(5) The bionic fiber adsorptive material prepared by the present invention has a fluffy multilayer structure, and the connection between the layers is the chemical bond connection, which helps the material maintain its good fluffy structure during the adsorption process, and has good regeneration performance. After 20 regenerations, the material can still rapidly remove of $Cu^{2+}$, $Fe^{3+}$, $Cd^{2+}$, $Cr^{6+}$ and $Pb^{2+}$ at low concentrations within 10 minutes to concentrations required by the national drinking water standard (US EPA).

DESCRIPTION OF THE EMBODIMENTS

The following embodiments further illustrate the present invention, but the embodiments should not be understood as a restriction on the present invention. Without departing from the spirit and essence of the present invention, simple modifications or replacements made to methods, steps or conditions of the present invention all fall within the scope of the present invention. Unless otherwise specified, the technical means used in the embodiments are conventional means well known to those skilled in the art.

Unless otherwise specified, reagents, methods and equipment used in the present invention are conventional reagents, methods and equipment in the art. Unless otherwise specified, the reagents and materials used in the following examples are all commercially available.

Embodiment 1

(1) Preparation of a carboxylated nanocellulose: 3 g of an absolute dry bagasse pulp fiber was weighed into a 500 mL boiling flask-3-neck, 300 mL of distilled water was added, then NaBr with a mole fraction of 5 mmol/g absolute dry bagasse pulp fiber and TEMPO with a mole fraction of 0.5 mmol/g absolute dry bagasse pulp fiber were added into the bagasse pulp fiber mixture in turn, an NaOH solution with a mass fraction of 10% was added dropwise to adjust pH value of 10, an NaClO solution with a mole fraction of available chlorine of 6 mmol/g absolute dry bagasse pulp fiber was added under a mixed liquid surface, mixed well, reacted for 4 hours, the NaOH solution was kept adding during the reaction to maintain pH value of 10 until the pH no longer changed, and 10 mL of ethanol was added to terminate the reaction. The reaction product was taken out, the solution was centrifuged and washed until it was neutral, and until no chloride ions can be detected, and the product was stored at 4° C. for later use.

(2) Preparation of a polyethyleneimine polymer modified by (ethylenedithio)diacetic acid containing N and S sites: 1 g of (ethylenedithio)diacetic acid was dispersed in 50 mL of distilled water, a polyethyleneimine with a molecular weight of 7000 was added according to a molar ratio of the (ethylenedithio)diacetic acid to the polyethyleneimine of 20:1, heated to 105° C. for amidation reaction for 4 hours, the reaction was cooled to room temperature, a dialysis bag with a molecular weight cut-off of 500 was used to dialysis for 24 hours to remove unreacted small molecules, excess water was removed by heating to adjust a concentration of a reaction product to 90 wt %, and the reaction product was stored at low temperature at 4° C.

(3) Preparation of a polyethyleneimine polymer modified by dopamine containing O and N sites: citric acid and dopamine were dissolved in 50 mL of deionized water according to a molar ratio of 1:2, reacted at 105° C. for 4 hours to prepare polycarboxylic acid-modified dopamine, a polyethyleneimine with a molecular weight of 7000 was added into a reaction system according to a molar ratio of the polyethyleneimine to citric acid of 1:10, reaction was continued for 4 hours, the product was put into a dialysis bag with a molecular weight cut-off of 500 to dialysis for 24 hours to remove unreacted small molecules, excess water was removed by heating to adjust a concentration of a reaction product to 90 wt %, and the reaction product was stored at low temperature at 4° C.

(4) Preparation of a polyethyleneimine polymer modified by hyperbranched polycarboxylic acid containing N and O sites: 0.1 mol of trimethylolpropane (13.4 g), 0.3 mol of citric acid (57.6 g) and p-toluenesulfonic acid (0.71 g) were first placed into a 250 mL boiling flask-3-neck; the boiling flask-3-neck was placed in an oil bath pan, and was connected with a mechanical stirring device, a middle port was connected with a stirring paddle with a rotation rate of 250 r/min, a left side port was plugged with a rubber plug, a right side port was connected with a condensing bend, and of the flask was covered with a rag at the top to facilitate the flow of water vapor from the bend during the reaction; the oil bath was set to 140° C., and the reaction was performed for 2 hours; at the end of the reaction, the product hyperbranched polycarboxylic acid was quickly poured from the side port with less water vapor into a small beaker, then the small beaker was sealed with plastic wrap, cooled at room temperature, and finally stored in a dryer; a polyethyleneimine with a molecular weight of 7000 and hyperbranched polycarboxylic acid were reacted at 105° C. for 4 hours according to a mass ratio of 1:1, excess water was removed by heating to adjust a concentration of a reaction product to 90 wt %, and the reaction product was stored at low temperature at 4° C.

(5) The carboxylated nanocellulose obtained in the step (1), the polyethyleneimine polymer modified by (ethylenedithio)diacetic acid containing N and S sites obtained in the step (2), the polyethyleneimine polymer modified by dopamine containing O and N sites obtained in the step (3), the polyethyleneimine polymer modified by hyperbranched polycarboxylic acid containing N and O sites obtained in the step (4) and graphene oxide were blended according to a mass ratio of 1:5:5:5:5, a fiber with multiple functional groups was continuously spun at a speed of 1 cm/s by a coaxial spinning method based on a principle of imitating spider spinning, 5 wt % of epichlorohydrin in a total fiber mass was sprayed on the fiber by a spraying mode under vacuum filtration conditions with a vacuum degree of 0.01 MPa to crosslink for 30 minutes, the crosslinking agent epichlorohydrin was infiltrated into the fiber relying on a low vacuum, and was freeze-dried for 24 hours to obtain the bionic fiber adsorptive material with multi-adsorption sites.

Embodiment 2

(1) Preparation of a carboxylated nanocellulose: 3 g of an absolute dry bagasse pulp fiber was weighed into a 500 mL boiling flask-3-neck, 300 mL of distilled water was added, then NaBr with a mole fraction of 3 mmol/g absolute dry bagasse pulp fiber and TEMPO with a mole fraction of 0.3 mmol/g absolute dry bagasse pulp fiber were added into the bagasse pulp fiber mixture in turn, an NaOH solution with a mass fraction of 20% was added dropwise to adjust pH value of 10, an NaClO solution with a mole fraction of available chlorine of 18 mmol/g absolute dry bagasse pulp fiber was added under a mixed liquid surface, mixed well, reacted for 6 hours, the NaOH solution was kept adding during the reaction to maintain pH value of 10 until the pH no longer changed, and 10 mL of ethanol was added to terminate the reaction. The reaction product was taken out, the solution was centrifuged and washed until it was neutral, and until no chloride ions can be detected, and the product was stored at 4° C. for later use.

(2) Preparation of a polyethyleneimine polymer modified by (ethylenedithio)diacetic acid containing N and S sites: 1 g of (ethylenedithio)diacetic acid was dispersed in 100 mL of distilled water, a polyethyleneimine with a molecular weight of 18000 was added according to a molar ratio of the (ethylenedithio)diacetic acid to the polyethyleneimine of 10:1, heated to 105° C. for amidation reaction for 6 hours, the reaction was cooled to room temperature, a dialysis bag with a molecular weight cut-off of 1000 was used to dialysis for 36 hours to remove unreacted small molecules, excess water was removed by heating to adjust a concentration of a reaction product to 70 wt %, and the reaction product was stored at low temperature at 4° C.

(3) Preparation of a polyethyleneimine polymer modified by dopamine containing O and N sites: oxalic acid and dopamine were dissolved in 50 mL of deionized water according to a molar ratio of 1:1, reacted at 105° C. for 6 hours to prepare polycarboxylic acid-modified dopamine, a polyethyleneimine with a molecular weight of 18000 was added into a reaction system according to a molar ratio of the polyethyleneimine to oxalic acid of 1:15, reaction was continued for 6 hours, the product was put into a dialysis bag with a molecular weight cut-off of 1000 to dialysis for 36 hours to remove unreacted small molecules, excess water was removed by heating to adjust a concentration of a reaction product to 70 wt %, and the reaction product was stored at low temperature at 4° C.

(4) Preparation of a polyethyleneimine polymer modified by hyperbranched polycarboxylic acid containing N and O sites: 0.1 mol of trimethylolpropane (13.4 g), 0.35 mol of citric acid (67.2 g) and p-toluenesulfonic acid (0.64 g) were first placed into a 250 mL boiling flask-3-neck; the boiling flask-3-neck was placed in an oil bath pan, and was connected with a mechanical stirring device, a middle port was connected with a stirring paddle with a rotation rate of 250 r/min, a left side port was plugged with a rubber plug, a right side port was connected with a condensing bend, and of the flask was covered with a rag at the top to facilitate the flow of water vapor from the bend during the reaction; the oil bath was set to 135° C., and the reaction was performed for 1.5 hours; at the end of the reaction, the product hyperbranched polycarboxylic acid was quickly poured from the side port with less water vapor into a small beaker, then the small beaker was sealed with plastic wrap, cooled at room temperature, and finally stored in a dryer; a polyethyleneimine with a molecular weight of 18000 and hyperbranched polycarboxylic acid were reacted at 105° C. for 6 hours according to a mass ratio of 1:2, excess water was removed by heating to adjust a concentration of a reaction product to 70 wt %, and the reaction product was stored at low temperature at 4° C.

(5) The carboxylated nanocellulose obtained in the step (1), the polyethyleneimine polymer modified by (ethylenedithio)diacetic acid containing N and S sites obtained in the step (2), the polyethyleneimine polymer modified by dopamine containing O and N sites obtained in the step (3), the polyethyleneimine polymer modified by hyperbranched polycarboxylic acid containing N and O sites obtained in the step (4) and graphene oxide were blended according to a mass ratio of 1:1:1:1:1, a fiber with multiple functional groups was continuously spun at a speed of 2 cm/s by a coaxial spinning method based on a principle of imitating spider spinning, 10 wt % of epichlorohydrin in a total fiber mass was sprayed on the fiber by a spraying mode under vacuum filtration conditions with a vacuum degree of 0.02 MPa to crosslink for 20 minutes, the crosslinking agent epichlorohydrin was infiltrated into the fiber relying on a low vacuum, and was freeze-dried for 36 hours to obtain the bionic fiber adsorptive material with multi-adsorption sites.

Embodiment 3

(1) Preparation of a carboxylated nanocellulose: 3 g of an absolute dry bamboo pulp fiber was weighed into a 500 mL boiling flask-3-neck, 300 mL of distilled water was added, then NaBr with a mole fraction of 1 mmol/g absolute dry bamboo pulp fiber and TEMPO with a mole fraction of 0.1 mmol/g absolute dry bamboo pulp fiber were added into the bamboo pulp fiber mixture in turn, an NaOH solution with a mass fraction of 30% was added dropwise to adjust pH value of 10, an NaClO solution with a mole fraction of available chlorine of 30 mmol/g absolute dry bamboo pulp fiber was added under a mixed liquid surface, mixed well, reacted for 8 hours, the NaOH solution was kept adding during the reaction to maintain pH value of 10 until the pH no longer changed, and 10 mL of ethanol was added to terminate the reaction. The reaction product was taken out, the solution was centrifuged and washed until it was neutral, and until no chloride ions can be detected, and the product was stored at 4° C. for later use.

(2) Preparation of a polyethyleneimine polymer modified by (ethylenedithio)diacetic acid containing N and S sites: 1 g of (ethylenedithio)diacetic acid was dispersed in 100 mL of distilled water, a polyethyleneimine with a molecular weight of 70000 was added according to a molar ratio of the (ethylenedithio)diacetic acid to the polyethyleneimine of 15:1, heated to 105° C. for amidation reaction for 8 hours, the reaction was cooled to room temperature, a dialysis bag with a molecular weight cut-off of 2000 was used to dialysis for 48 hours to remove unreacted small molecules, excess water was removed by heating to adjust a concentration of a reaction product to 50 wt %, and the reaction product was stored at low temperature at 4° C.

(3) Preparation of a polyethyleneimine polymer modified by dopamine containing O and N sites: 1,2,3,4-butanetetracarboxylic acid and dopamine were dissolved in 50 mL of deionized water according to a molar ratio of 1:3, reacted at 105° C. for 8 hours to prepare polycarboxylic acid-modified dopamine, a polyethyleneimine with a molecular weight of 70000 was added into a reaction system according to a molar ratio of the polyethyleneimine to 1,2,3,4-butanetetracarboxylic acid of 1:20, reaction was continued for 8 hours, the product was put into a dialysis bag with a molecular weight cut-off of 2000 to dialysis for 48 hours to remove unreacted small molecules, excess water was removed by heating to adjust a concentration of a reaction product to 50 wt %, and the reaction product was stored at low temperature at 4° C.

(4) Preparation of a polyethyleneimine polymer modified by hyperbranched polycarboxylic acid containing N and O sites: 0.1 mol of trimethylolpropane (13.4 g), 0.4 mol of citric acid (76.8 g) and p-toluenesulfonic acid (1.35 g) were first placed into a 250 mL boiling flask-3-neck; the boiling flask-3-neck was placed in an oil bath pan, and was connected with a mechanical stirring device, a middle port was connected with a stirring paddle with a rotation rate of 250 r/min, a left side port was plugged with a rubber plug, a right side port was connected with a condensing bend, and of the flask was covered with a rag at the top to facilitate the flow of water vapor from the bend during the reaction; the oil bath was set to 150° C., and the reaction was performed for 2.5 hours; at the end of the reaction, the product hyperbranched polycarboxylic acid was quickly poured from the side port with less water vapor into a small beaker, then the small beaker was sealed with plastic wrap, cooled at room temperature, and finally stored in a dryer; a polyethyleneimine with a molecular weight of 70000 and hyperbranched polycarboxylic acid were reacted at 105° C. for 8 hours according to a mass ratio of 1:3, excess water was removed by heating to adjust a concentration of a reaction product to 50 wt %, and the reaction product was stored at low temperature at 4° C.

(5) The carboxylated nanocellulose obtained in the step (1), the polyethyleneimine polymer modified by (ethylenedithio)diacetic acid containing N and S sites obtained in the step (2), the polyethyleneimine polymer modified by dopamine containing O and N sites obtained in the step (3), the polyethyleneimine polymer modified by hyperbranched polycarboxylic acid containing N and O sites obtained in the step (4) and graphene oxide were blended according to a mass ratio of 1:10:10:10:10, a fiber with multiple functional groups was continuously spun at a speed of 4 cm/s by a coaxial spinning method based on a principle of imitating spider spinning, 15 wt % of epichlorohydrin in a total fiber mass was sprayed on the fiber by a spraying mode under vacuum filtration conditions with a vacuum degree of 0.04 MPa to crosslink for 10 minutes, the crosslinking agent epichlorohydrin was infiltrated into the fiber relying on a low vacuum, and was freeze-dried for 48 hours to obtain the bionic fiber adsorptive material with multi-adsorption sites.

The bionic fiber adsorptive material with multi-adsorption sites prepared in Embodiments 1, 2 and 3 were tested for the adsorption performance of heavy metal ions in water. The test results are shown in the following table. The test results show that the bionic fiber adsorptive material with multi-adsorption sites according to the present invention can realize the simultaneous and rapid removal of anion and cationic heavy metal ions at low concentration (3 g/mL), can remove the heavy metal ions in the solution to meet drinking water standard (US EPA) within 10 minutes, and can remove 100% of the heavy metal ions in the solution within 30 minutes.

| Material | Type of heavy metal ions | Adsorption time required to remove to meet drinking water standard | Total removal rate in 10 minutes | Adsorption time required to remove 100% of the five heavy metal ions |
|---|---|---|---|---|
| Material prepared in Embodiment 1 | $Fe^{3+}$ | 2 min | 99.4% | 30 min |
| | $Cu^{2+}$ | 1 min | 100% | |
| | $Pb^{2+}$ | 10 min | 97.2% | |
| | $Cr^{6+}$ | 3 min | 100% | |
| | $Cd^{2+}$ | 2 min | 98.2% | |
| Material prepared in Embodiment 2 | $Fe^{3+}$ | 3 min | 98.6% | 26 min |
| | $Cu^{2+}$ | 1 min | 100% | |
| | $Pb^{2+}$ | 9 min | 98.5% | |
| | $Cr^{6+}$ | 2 min | 100% | |
| | $Cd^{2+}$ | 2 min | 96.8% | |
| Material prepared in Embodiment 3 | $Fe^{3+}$ | 3 min | 100% | 28 min |
| | $Cu^{2+}$ | 1 min | 100% | |
| | $Pb^{2+}$ | 10 min | 99.1% | |
| | $Cr^{6+}$ | 2 min | 100% | |
| | $Cd^{2+}$ | 4 min | 97.5% | |

What is claimed is:

1. A preparation method of a bionic fiber adsorptive material with multi-adsorption sites comprising the following steps:
    step S1, preparation of a carboxylated nanocellulose: adopting a TEMPO/NaBr/NaClO oxidation system to oxidize a biomass fiber, and regulating an oxidation level by controlling reaction conditions to obtain the carboxylated nanocellulose;
    step S2, preparation of a polyethyleneimine polymer modified by (ethylenedithio)diacetic acid containing N and S sites: performing a first amidation reaction of (ethylenedithio)diacetic acid with a polyethyleneimine at a first temperature to obtain polyethyleneimine polymer modified by (ethylenedithio)diacetic acid containing N and S sites;
    step S3, preparation of a polyethyleneimine polymer modified by dopamine containing O and N sites: performing a second amidation reaction of a polycarboxylic acid with dopamine at a second temperature; when the second amidation reaction is complete, continuing to add polyethyleneimine to perform a third amidation reaction to obtain polyethyleneimine polymer modified by dopamine containing O and N sites; wherein the polycarboxylic acid is oxalic acid, citric acid or 1,2,3,4-butanetetracarboxylic acid;
    step S4, preparation of a polyethyleneimine polymer modified by hyperbranched polycarboxylic acid containing N and O sites: performing a fourth amidation reaction of hyperbranched polycarboxylic acid with polyethyleneimine at a third temperature to obtain the polyethyleneimine polymer modified by hyperbranched polycarboxylic acid containing the N and O sites; and
    step S5, blending the carboxylated nanocellulose obtained in the step S1, the polyethyleneimine polymer modified by (ethylenedithio)diacetic acid containing the N and S sites obtained in the step S2, the polyethyleneimine polymer modified by dopamine containing the O and N sites obtained in the step S3, the polyethyleneimine polymer modified by hyperbranched polycarboxylic acid containing the N and O sites obtained in the step S4, and graphene oxide by a blending method to prepare a spinning solution, continuously spinning the spinning solution to form a fiber with multiple functional groups at a speed of 1-4 cm/s by using a coaxial spinning method, spraying 5 wt % to 15 wt % of a crosslinking agent in a total fiber mass on the fiber by a spraying mode under vacuum filtration conditions with a vacuum having a degree of 0.01 MPa to 0.04 MPa to crosslink for 10-30 minutes, infiltrating the crosslinking agent into the fiber relying on the vacuum, and freeze-drying for 24-48 hours to obtain the bionic fiber adsorptive material with multi-adsorption sites; wherein the material is rich in multi-adsorption sites, that is, N, O and S sites that have chelating performance for heavy metal ions; adjusting content of each adsorption site in the material by regulating a ratio of each component in the spinning solution, wherein the crosslinking agent is epichlorohydrin.

2. The preparation method according to claim 1, wherein a specific operation of the preparation of the carboxylated nanocellulose described in the step S1 is as follows: dispersing the biomass fiber in water to prepare a biomass fiber mixture, then adding NaBr with a mole fraction of 1-5 mmol/g absolute dry fiber and TEMPO with a mole fraction of 0.1-0.5 mmol/g absolute dry fiber into the biomass fiber mixture in turn, and then adding an NaOH solution with a mass fraction of 10-30% to adjust the pH value to 10, adding an NaClO solution with a mole fraction of available chlorine of 6-30 mmol/g absolute dry fiber into the biomass fiber mixture under a mixed liquid surface, mixing the biomass fiber mixture and the NaClO solution well, reacting for 4-8 hours, continuing to add the NaOH solution during the reaction to maintain the pH value of 10 until the pH value no longer changes, and adding ethanol to terminate the reaction to obtain the carboxylated nanocellulose.

3. The preparation method according to claim 1, wherein a specific operation of the preparation of the polyethyleneimine polymer modified by (ethylenedithio)diacetic acid containing N and S sites described in the step S2 is as follows: dispersing (ethylenedithio)diacetic acid in water, adding the polyethyleneimine with a molecular weight of 7000-70000 according to a molar ratio of (ethylenedithio)diacetic acid to the polyethyleneimine of 10:1-20:1, reacting for 4-8 hours at the first temperature, performing dialysis using a dialysis bag with a molecular weight cut-off of 500-2000 for 24-48 hours, so as to remove unreacted small molecules after performing the first amidation reaction, removing excess water by heating to adjust a concentration of a reaction product to 50 wt % to 90 wt % to obtain the polyethyleneimine polymer modified by (ethylenedithio)diacetic acid containing N and S sites.

4. The preparation method according to claim 1, wherein a specific operation of the preparation of the polyethyleneimine polymer modified by dopamine containing O and N sites described in the step S3 is as follows: adding the polycarboxylic acid and dopamine into water according to a molar ratio of 1:1-3:1, reacting for 4-8 hours at the second temperature to prepare polycarboxylic acid-modified dopamine, then adding the polyethyleneimine with a molecular weight of 7000-70000 into a reaction system according to a molar ratio of polyethyleneimine to polycarboxylic acid of 1:10-1:20, continuing reacting for 4-8 hours, performing dialysis using a dialysis bag with a molecular weight cut-off of 500-2000 for 24-48 hours, so as to remove unreacted small molecules after performing the second amidation reaction and the third amidation reaction, removing excess water by heating to adjust a concentration of a reaction product to 50 wt % to 90 wt % to obtain the polyethyleneimine polymer modified by dopamine containing O and N sites.

5. The preparation method according to claim 1, wherein a specific operation of the polyethyleneimine polymer modified by hyperbranched polycarboxylic acid containing N and O sites described in the step S4 is as follows: mixing trimethylolpropane, citric acid and p-toluenesulfonic acid and reacting at 135-150° C. under stirring conditions for 1.5-2.5 hours to obtain hyperbranched polycarboxylic acid; a molar ratio of the trimethylolpropane to the citric acid is 0.1:0.3-0.1:0.4 and an added mass of the p-toluenesulfonic acid is 0.8%-1.5% of a total mass of the trimethylolpropane and the citric acid; reacting the polyethyleneimine with the molecular weight of 7000-70000 and the hyperbranched polycarboxylic acid according to a mass ratio of 1:1-1:3 for 4-8 hours at the third temperature, and heating to evaporate water to adjust a concentration of a reaction product to 50 wt % to 90 wt % to obtain the polyethyleneimine polymer modified by hyperbranched polycarboxylic acid containing N and O sites.

6. The preparation method according to claim 1, wherein the blending method comprises: blending the carboxylated nanocellulose obtained in the step S1, the polyethyleneimine polymer modified by (ethylenedithio)diacetic acid containing N and S sites obtained in the step S2, the polyethyleneimine polymer modified by dopamine containing O and N sites obtained in the step S3, the polyethyleneimine polymer modified by hyperbranched polycarboxylic acid containing N and O sites obtained in the step S4 and graphene oxide according to a mass ratio of 1:(1-10):(1-10):(1-10):(1-10).

\* \* \* \* \*